(12) United States Patent
Chandrashekar et al.

(10) Patent No.: US 9,693,327 B2
(45) Date of Patent: Jun. 27, 2017

(54) MULTIMEDIA STREAMING OVER MULTIPLE HOPS IN WIFI MESH NETWORK

(71) Applicant: Honeywell International Inc., Morristown, NJ (US)

(72) Inventors: Madhu T. Chandrashekar, Karnataka (IN); Santosh Mallikarjuna Mandiganal, Karnataka (IN); Arun V. Mahasenan, Trivandrum Kerala (IN)

(73) Assignee: Honeywell International Inc., Morris Plains, NJ (US)

( * ) Notice: Subject to any disclaimer, the term of this patent is extended or adjusted under 35 U.S.C. 154(b) by 141 days.

(21) Appl. No.: 14/464,154

(22) Filed: Aug. 20, 2014

(65) Prior Publication Data

US 2016/0057721 A1 Feb. 25, 2016

(51) Int. Cl.
| | |
|---|---|
| *H04W 84/00* | (2009.01) |
| *H04W 56/00* | (2009.01) |
| *H04W 84/18* | (2009.01) |
| *H04L 29/06* | (2006.01) |
| *H04W 88/08* | (2009.01) |

(52) U.S. Cl.
CPC ..... *H04W 56/0015* (2013.01); *H04L 65/4069* (2013.01); *H04W 84/00* (2013.01); *H04W 84/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 7,830,834 B2* | 11/2010 | Das | ...................... | H04W 48/08 370/256 |
| 8,326,985 B2* | 12/2012 | Luna | ..................... | H04L 67/145 370/311 |
| 8,774,077 B2* | 7/2014 | Finn | ....................... | H04W 4/16 370/312 |
| 2010/0215187 A1* | 8/2010 | Moosavi | ............... | H04R 27/00 381/82 |
| 2014/0003286 A1 | 1/2014 | Estevez et al. | | |
| 2014/0068023 A1* | 3/2014 | Arickan | ............. | H04L 61/2015 709/220 |
| 2014/0126461 A1 | 5/2014 | Ghosh et al. | | |
| 2014/0169569 A1* | 6/2014 | Toivanen | ................. | H04R 5/04 381/17 |

FOREIGN PATENT DOCUMENTS

| | | |
|---|---|---|
| EP | 2632106 A1 | 8/2013 |
| EP | 2640100 A1 | 9/2013 |

OTHER PUBLICATIONS

"European Application Serial No. 15180653.6, Extended European Search Report mailed Dec. 16, 2015", 8 pgs.
"Wi-Fi Display Technical Specification Version 1.0.0", Wi-Fi Alliance Technical Committee, Wi-Fi Display Technical Task Group, (Aug. 24, 2012), 149 pgs.

* cited by examiner

*Primary Examiner* — Alex Skripnikov
(74) *Attorney, Agent, or Firm* — Schwegman Lundberg & Woessner, P.A.

(57) ABSTRACT

A network includes an access point Wi-Fi Direct (AP WFD) device. The AP WFD device includes access point (AP) functionality. A plurality of client WiFi Direct (WFD) devices is coupled to the AP WFD device. The client WFD devices include client functionality. The AP WFD device is configured to synchronize the client WFD devices and to stream multimedia data to the client WFD devices.

17 Claims, 4 Drawing Sheets

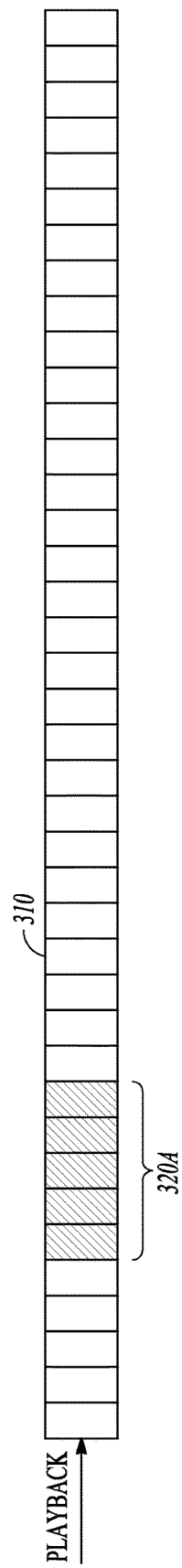
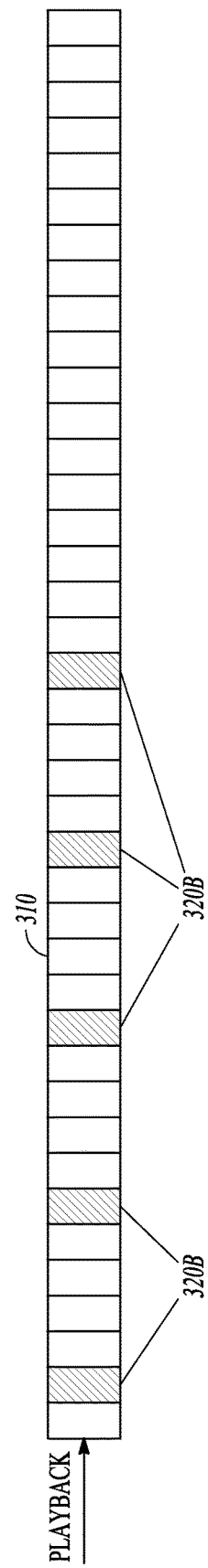

MULTIMEDIA STREAMING OVER MULTIPLE HOPS IN WIFI MESH NETWORK

TECHNICAL FIELD

The present disclosure relates to multimedia streaming over multiple hops in a Wi-Fi based wireless mesh network.

BACKGROUND

Public address (PA) and voice annunciation (VA) systems stream live audio (multimedia) announcements across a large number speaker nodes distributed in a building. Speaker nodes are triggered to start announcements for emergency evacuation, mass notifications, and office announcements, or to play background music. All speaker nodes are wire connected with a centralized monitoring and announcement panel (voice control panel).

Unfortunately, speaker nodes deployed in such a system require multiple pairs of wires from the central panel to both power the device and to receive audio data. This makes the network deployment slow and costly. Current systems are hard-wired and can create zones only during deployment, which cannot later be changed if the building is renovated. Also, testing of such a system requires the entire building to be evacuated. The maintenance cost of such a system is high as large lengths of wires that are required to cover the building have to be monitored and replaced. In some systems, speaker nodes can communicate wirelessly using Bluetooth or Wi-Fi, but they are restricted to one hop, and are used as part of a wired system, not as a standalone system to cover the entire building or part of the facility.

BRIEF DESCRIPTION OF THE DRAWINGS

FIG. 3A illustrates an effect of audio loss during a playback of a normal data packet.

FIG. 3B illustrates an effect of audio loss during a playback of a punctuated data packet.

DETAILED DESCRIPTION

Figure 1A:
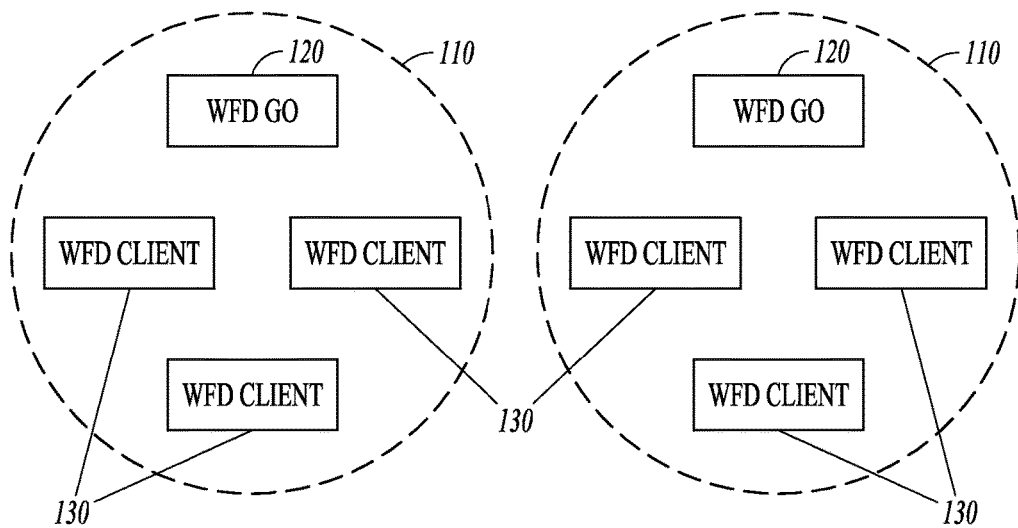
FIG. 1A is a block diagram illustrating networks that include WiFi Direct (WFD) devices.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Wi-Fi Direct® is a certification mark for devices supporting a technology that enables Wi-Fi devices to connect directly, making it simple and convenient to do things like print, share, synchronize, and display. Products with the Wi-Fi Direct technology can connect to one another without joining a traditional home, office, or hotspot network. Devices can make a one-to-one connection, or a group of several devices can connect simultaneously. Wi-Fi Direct device connections do not need access to a Wi-Fi network. Wi-Fi Direct devices emit a signal to other devices in the area, letting them know a connection can be made. When two or more Wi-Fi Direct-certified devices connect directly, they form a Wi-Fi Direct Group. This standard with connection management in P2P GO, P2P client, and WFD bridge can be used to form wireless mesh networks to stream audio announcements for PA/VA systems.

An embodiment addresses the problems currently faced with Wired Public Addressing and Voice Annunciation (PA-VA) systems. Every speaker in a PA-VA system must be wired for power and audio streaming, which involves a large effort to lay cables and place the speakers. It also takes a lot of time to perform the individual speaker testing as each speaker is not addressable. Going to wireless speakers using Bluetooth and WiFi is restricted to one hop as time synchronization happens only between master and client nodes. It is also difficult to meet transmission latency if there is a multiple hop network that carries live audio.

In an embodiment, reliable audio transmission over a wireless mesh network replaces devices such as existing wired PA-VA speakers with wireless networked PA-VA speakers. This is accomplished by audio data streaming over multiple hops in the wireless mesh network. The Wi-Fi Direct® standard is used to form the mesh network. Time synchronization across the multiple hops in the network is achieved to maintain good audio intelligibility, to synchronously playback audio announcements between speaker nodes, and to meet communication latencies required to meet better quality of service (QOS) for live audio streaming.

In a first step, a network is formed. Specifically, Wi-Fi Direct® technology defined by the Wi-Fi Alliance is used to form the local network. The local network has the capability of time synchronizing. Wi-Fi Direct® is a technology defined by the Wi-Fi Alliance wherein capable devices can connect directly to each other. Wi-Fi Direct® devices, formally known as P2P devices, communicate by establishing P2P groups, which are functionally equivalent to traditional Wi-Fi infrastructure networks. A device implementing AP-like functionality in the P2P group is referred to as the P2P Group Owner (P2P GO/WFD GO). Devices acting as clients are known as P2P clients or a WFD client. A WFD GO device synchronizes all the clients and can also stream multimedia to all its clients with QOS. This first step creates an access point-station (AP-STA) type of network with a one hop connection.

The P2P GO device acts as an AP and the P2P client devices act as an STA device, like in a normal AP-STA connection. The WFD GO device sends its time in the TS field of its beacon frames in a standard Wi-Fi Beacon frame. The WFD clients correct their time to this. The WFD GO device can do either multicast or unicast to each of its WFD clients connected with normal Wi-Fi retransmissions.

FIG. 1A illustrates networks 110 utilizing the WiFi Direct® technology. The networks 110 include a group owner device 120, which can communicate with each WFD client device 130 in the networks 110.

In a second step, multiple such networks are synchronized. The multiple networks are bridged so as to form a mesh. Bridging two such networks provides a two hop connection. Time synchronization information is communicated between the networks using the bridge. The bridging is extended to form an 'N' hop mesh network.

The bridging node is a WFD GO device that operates in multi mode where it acts as both a WFD GO device and a WFD CLI (client) device. In WFD CLI mode, it connects to the master WFD GO device to get the centralized time and corrects its local time. The corrected local time is used by both the WFD GO and WFD CLI modes. In the WFD GO mode, it distributes the corrected local time to its WFD Clients. Hence the centralized time will be propagated to the whole network. Since all the networks synchronize to the distributed centralized clock, a common sense of time is achieved across the complete mesh network. The maximum drift achieved from this is within 50 micro seconds.

Figure 1B:
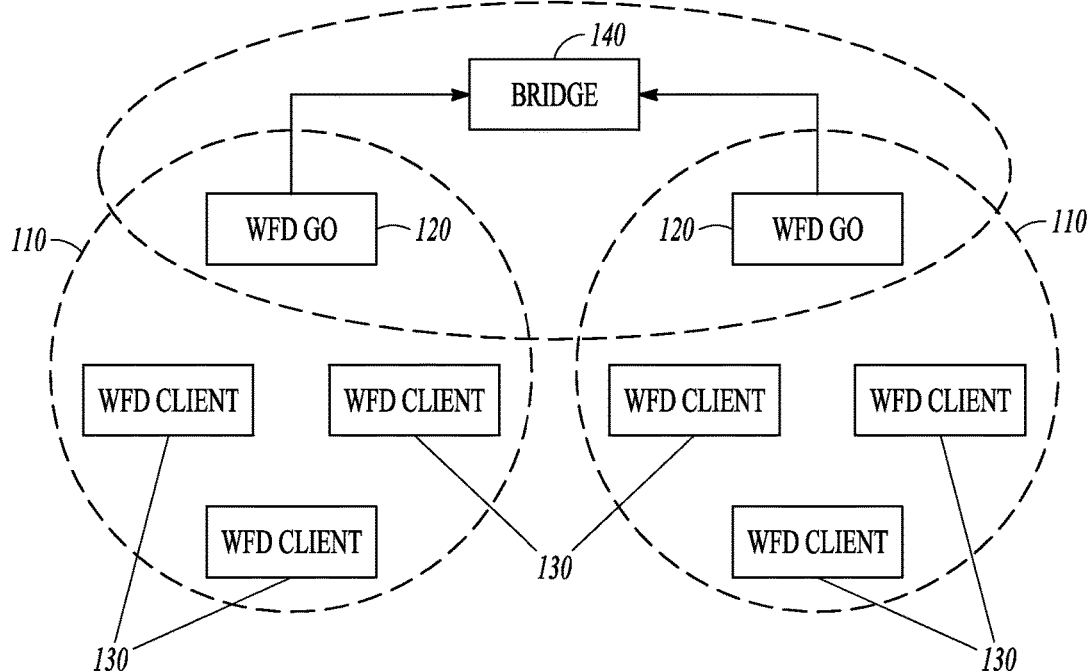
FIG. 1B is a block diagram illustrating a bridge between the WFD networks of FIG. 1A.

FIG. 1B illustrates a bridge 140 that couples two Wi-Fi Direct® networks together via the WFD group owner devices 120. The bridge 140 includes processors and software.

There is a GATEWAY WFD GO node that is the Master/GATEWAY of the complete mesh network, which circulates the centralized time to the whole network.

Each network uses a different frequency for packet transmission to reduce the interference while relaying the audio packets.

The WFD nodes are connected with an audio booster pack for processing of the audio, such as sequencing, buffering, encoding, decoding, and ADC/DAC conversions. These booster packs will also be connected with an audio amplifier to drive a battery operated speaker system.

The audio streaming starting from the GATEWAY/master is uni-casted and/or multi-casted to the WFD CLIent nodes which are connected to it. These WFD CLIent nodes in their WFD GO mode forward the same audio message to their WFD CLIent nodes.

The master/Gateway will also send an Audio PlayBack trigger time (future timestamp) along with audio data to all the nodes. All the nodes will be buffering PA-VA announcement streaming until the Playback Trigger Time and all nodes starts playing the buffered audio synchronously after this trigger time. Using these buffering and triggering techniques synchronizes audio playback from all the nodes even at different levels of data transmissions that it takes to reach each node from the centralized announcer. No two speakers in the audible range have more than 5 millisecond drift in an announcement.

The Master/GATEWAY node sends a PlayBack Stop trigger after an announcement, on which all the nodes will stop the Audio PlayBack and turn OFF the speakers for power save.

To reduce packet loss impact on audio intelligibility, the audio data packets are split and rearranged. A packet puncturing technique can be used for the splitting and rearranging, thereby resulting in minimal data loss.

Figure 2A:
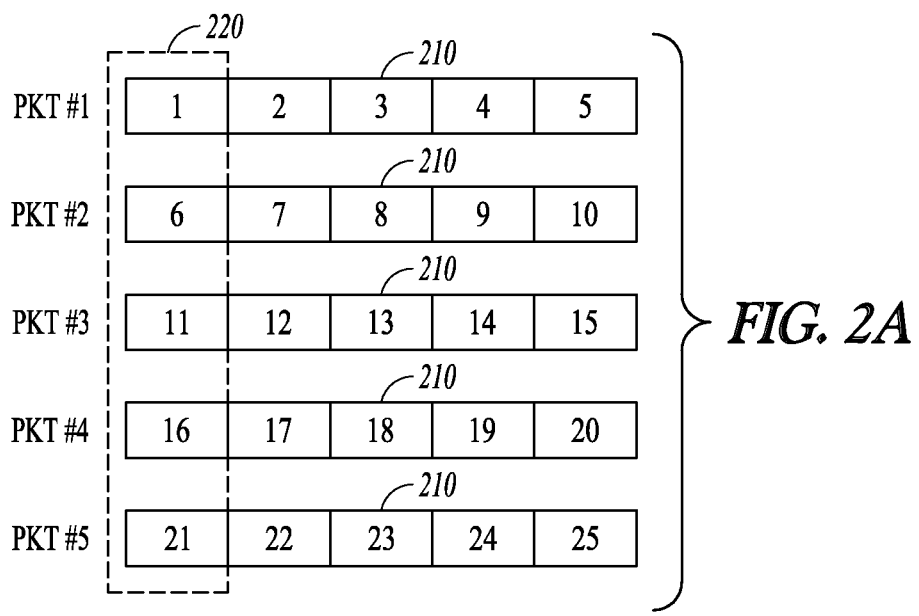
FIG. 2A illustrates a set of normal data packets.
Figure 2B:
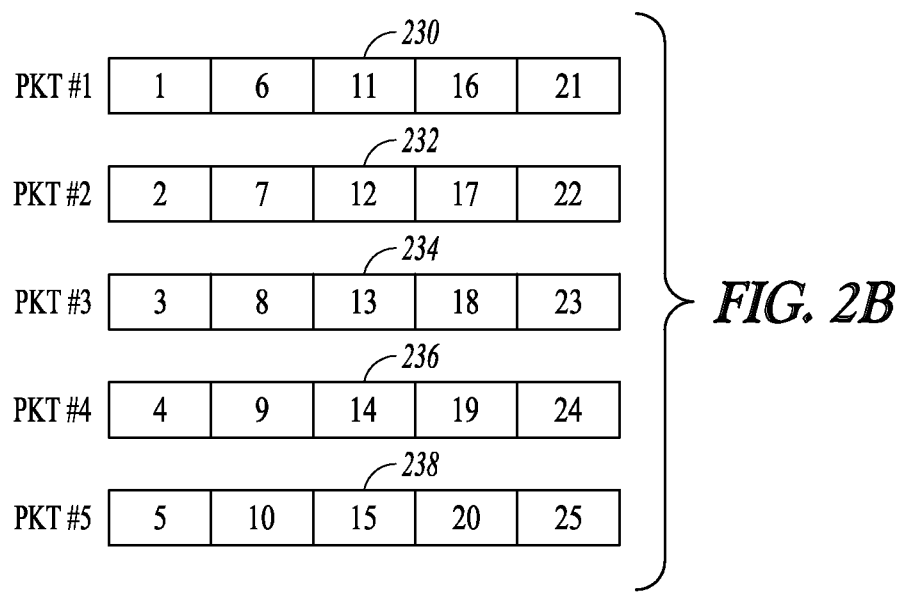
FIG. 2B illustrates a set of punctuated data packets.

FIG. 2A illustrates several packets 210 for transmission. In a third step, the impact of packet loss on audio intelligibility is reduced. The use of a packet puncturing technique reduces the packet loss impact on the audio playback. This technique depends on the audio compression and data transmission rate. Prior to transmission, the packets are split and rearranged into the packet structure as illustrated in FIG. 2B. In this embodiment, the first cells 220 of each packet 210 in FIG. 2A (1, 6, 11, 16, 21) are split off from the packets 210 and concatenated into a new data packet 230 as illustrated in FIG. 2B. Similarly, the second, third, fourth, and fifth cells of each packet 210 in FIG. 2A are concatenated into a second, third, fourth, and fifth packets 232, 234, 236, and 238 in FIG. 2B. FIGS. 2A and 2B are just an example, and other means of partitioning and puncturing could be used.

FIGS. 3A and 3B illustrate the effect of puncturing and partitioning audio data packets. Specifically, if a normal packet is dropped in transmission 310, the contiguous data packet is lost and this leaves a missing data segment 320A as illustrated in FIG. 3A. However, if the packets are punctuated prior to transmission 310, a loss of a data packet results in the loss of non-contiguous data, so that upon reassembly of the packets and playback of the packets, much narrower bands 320B of the data are missing and there is less disruption in the playback of the audio file.

For example, a 1 kb audio packet transmission constitutes 125 msec of playback in an 8 kbps playback setup. A single packet loss in a normal transmission introduces audio loss for 125 msec of playback time. In a packet punctured transmission, each packet is split into m (e.g., m=5) parts for n (e.g., n=5) number of audio packets. Then, one m part is taken in each of the n packets, a new packet is formed, and the new packet is transmitted. Consequently, in a packet punctured setup, a single packet loss only constitutes a loss of 25 msec playback time. It is noted that this packet puncturing technique requires packet buffering and introduces some delay.

With this, end to end packet distortion of not more than 7% can be achieved from live announcement input to the last playback speaker.

Figure 4:
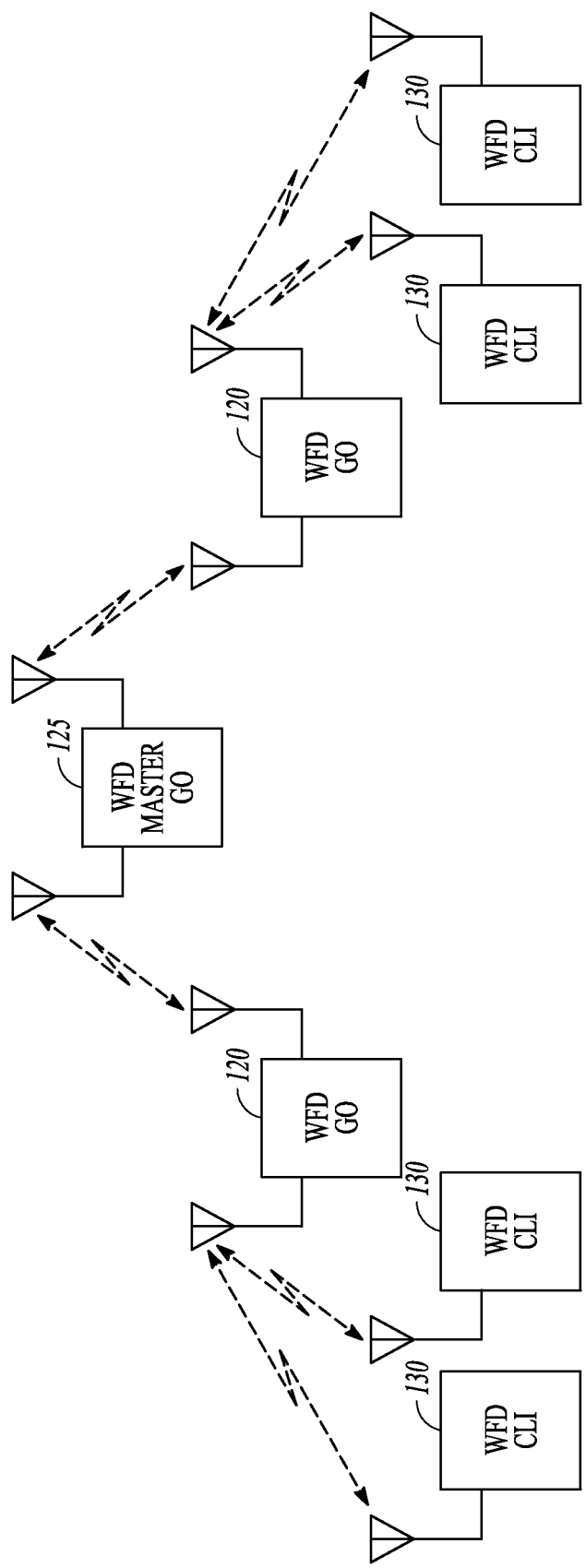
FIG. 4 is a block diagram of a network that includes a master group owner, non-master group owners, and clients.

For reliable packet transmission and network handling, Multiple-Input and Multiple-Output (MIMO) radios can be used for handling the concurrent operations simultaneously in different radios. Such a setup is illustrated in FIG. 4. Specifically, one radio acts as a WFD GO device 120 dedicated to handling its network of WFD client devices 130. This same radio 120 can be connected to a master WFD GO device 125, thereby also acting as a WFD Client. The same clock source is used in both the client and the GO role, and the clock is always updated from the master GO device 125.

In a fourth step, packet transmission and network handling are made more reliable. MIMO radios that can operate in concurrent (i.e., both AP and STA) mode can be used. In the AP mode, the local one hop mesh network is formed. In the STA mode, a connection is made to another AP and the data is synchronized.

EXAMPLES

Example No. 1 is a first network that includes a first access point WiFi Direct Group Owner (WFD GO or AP WFD) device comprising access point (AP) functionality; and a plurality of first client WiFi Direct Client (WFD) devices coupled to the first AP WFD device, the first client WFD devices comprising a client functionality; wherein the first AP WFD device is configured to synchronize the first client WFD devices and to stream multimedia data to the first client WFD devices.

Example No. 2 includes all the features of Examples No. 1, and optionally includes a bridge coupling the first network to a second network, the second network comprising a second AP WFD device and a plurality of second client WFD devices comprising client functionality.

Example No. 3 includes all the features of Example Nos. 1-2, and optionally includes a network wherein the first AP WFD device and the second AP WFD device are configured to time synchronize and to exchange data between the first network and the second network.

Example No. 4 includes all the features of Example Nos. 1-3, and optionally includes a network wherein the first AP WFD device comprises bridges to a plurality of additional AP WFD devices in a plurality of additional networks.

Example No. 5 includes all the features of Example Nos. 1-4, and optionally includes a network wherein the first AP WFD device is configured to send audio data packets to the second AP WFD device and its WFD Client devices by splitting up cells of the audio data packets and rearranging the cells of the audio data packets into new audio data packets.

Example No. 6 includes all the features of Example Nos. 1-5, and optionally includes a network wherein a cell in a first position in each data packet is removed from each data packet and assembled into the new audio data packet.

Example No. 7 includes all the features of Example Nos. 1-6, and optionally includes a network wherein the first AP WFD device coupled to a single centralized master time distributer which is another AP WFD device to which the first AP WFD devices synchronize. After which the client WFD devices synchronize to the AP WFD devices for which they are connected.

Example No. 8 includes all the features of Example Nos. 1-7, and optionally includes a network wherein the AP WFD devices and the first client WFD devices are configured to track time synchronization accuracy via the AP WFD device; and wherein the AP WFD devices and the first client WFD devices are configured to forward time to other AP WFD devices and other first client WFD devices, only after proper synchronization.

Example No. 9 includes all the features of Example Nos. 1-8, and optionally includes a network wherein the client WFD devices are configured, upon missing a time information packet, to automatically reconnect to a neighboring AP WFD and reestablish a link to the first network.

Example No. 10 includes all the features of Example Nos. 1-9, and optionally includes a network wherein the first client WFD devices are configured to send a status and a time synchronization accuracy to their associated AP WFD device; and wherein the associated AP WFD device is configured to send aggregated status and time synchronization information of the first client WFD devices connected to its associated AP WFD device which is acting as bridge.

Example No. 11 includes all the features of Example Nos. 1-10, and optionally includes a network wherein a centralized master AP WFD device comprises status and time synchronization information of all first client WFD devices and all AP WFD devices in the complete network.

Example No. 12 includes all the features of Example Nos. 1-11, and optionally includes a network wherein the client WFD devices and AP WFD devices comprise a common time; and wherein the centralized master AP WFD device transmits an audio trigger before announcing, the audio trigger comprising a future timestamp; and wherein the client WFD and AP WFD devices commence a playback at a time after the future timestamp.

Example No. 13 includes all the features of Example Nos. 1-12, and optionally includes a network wherein the client WFD and AP WFD devices buffer audio data for a time period prior to the future timestamp.

Example No. 14 includes all the features of Example Nos. 1-13, and optionally includes a network wherein the AP WFD device is configured, upon receiving audio packets, to copy the audio packet to a playback buffer and to thereafter multi-cast the audio packet to one or more first client WFD devices which are connected to it; and wherein the first client WFD devices only configured to receive and buffer the audio packets for playback.

Example No. 15 includes all the features of Example Nos. 1-14, and optionally includes a network wherein the client WFD and AP WFD devices are configured to remain silent when there is one or more missing data packets and are configured to play data packets upon receiving actual audio data.

Example No. 16 includes all the features of Example Nos. 1-15, and optionally includes a network wherein the centralized master AP WFD comprises a dynamic host configuration protocol (DHCP) server configured to distribute a common Internet Protocol (IP) address across the network; and wherein all the WFD devices are IP addressable and can be connected in a debug mode to a mobile device using a wireless proprietary application.

Example No. 17 includes all the features of Example Nos. 1-16, and optionally includes a network comprising an aggregate audio stream comprising one or more of a first audio stream, a second audio stream, a third audio stream, and a fourth audio stream; wherein an audio packet follows a same path and reaches all the WFD devices in the network.

Example No. 18 includes all the features of Example Nos. 1-17, and optionally includes a network comprising a master AP WFD that comprises a capability to select an individual WFD device, a group of WFD devices, or all WFD devices in the network to play an audio stream.

Example No. 19 includes all the features of Example Nos. 1-18, and optionally includes a network comprising a local parent AP WFD device that is configured to maintain a connection to a particular client WFD device by using a normal keep alive mechanism; wherein a duration of the keep alive mechanism is reduced to approximately 10 seconds; and wherein these AP WFD devices that are connected to other AP WFD devices through bridge transmit aggregated health information to the master AP WFD.

Example No. 20 includes all the features of Example Nos. 1-19, and optionally includes a network wherein one or more WFD devices comprise an audio speaker in a public announcement system.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A first network comprising:
a first access point WiFi Direct (AP WFD) device comprising access point (AP) functionality; and
a plurality of first client WiFi Direct (WFD) devices coupled to the first AP WFD device, the first client WFD devices comprising a client functionality;
wherein the first AP WFD device is configured to synchronize the first client WFD devices and to stream multimedia data to the first client WFD devices;
wherein the first AP WFD device comprises a master AP WFD device; and
wherein the first network further comprises a single centralized master time distributer to which the first AP WFD device synchronizes, after which the first client WFD devices synchronize to the first AP WFD device to which the first client WFD devices are connected; and
wherein other AP WFD devices and the first client WFD devices are configured to track time synchronization accuracy via the first AP WFD device;
wherein the first AP WFD device and the first client WFD devices are configured to forward time to the other AP WFD devices and additional first client WFD devices only after proper synchronization; and
wherein the first client WFD devices are configured, upon missing a time information packet, to automatically reconnect to a neighboring AP WFD and reestablish a link to the first network.

2. The first network of claim 1, comprising:
a bridge coupling the first network to a second network, the second network comprising a second AP WFD device and a plurality of second client WFD devices comprising client functionality.

3. The first network of claim 2, wherein the first AP WFD device and the second AP WFD device are configured to time synchronize and to exchange data between the first network and the second network.

4. The first network of claim 3, wherein the first AP WFD device comprises bridges to a plurality of additional AP WFD devices in a plurality of additional networks.

5. The first network of claim 2, wherein the first AP WFD device is configured to send audio data packets to the second AP WFD device by splitting up cells of the audio data packets and rearranging the cells of the audio data packets into new audio data packets.

6. The first network of claim 5, wherein each audio data packet includes a plurality of cells in sequence, with a first cell followed by a second cell, and the second cell followed by a third cell, and wherein the first cell in each audio data packet is removed from each audio data packet and assembled in sequence into the new audio data packet.

7. The first network of claim 1, wherein the first client WFD devices are configured to send a status and a time synchronization accuracy to their associated AP WFD device; and
wherein the associated AP WFD device is configured to send aggregated status and time synchronization information of the first client WFD devices connected to its associated AP WFD device which is acting as bridge.

8. The first network of claim 1, wherein the master AP WFD device comprises status and time synchronization information of all first client WFD devices and all AP WFD devices in a complete network.

9. The first network of claim 8, wherein the first client WFD devices and the first AP WFD device comprise a common time; and
wherein the master AP WFD device transmits an audio trigger before announcing, the audio trigger comprising a future timestamp; and
wherein the first client WFD devices and the first AP WFD device commence a playback at a time after the future timestamp.

10. The first network of claim 9, wherein the first client WFD devices and the first AP WFD device buffer audio data for a time period prior to the future timestamp.

11. The first network of claim 8, wherein the master AP WFD device comprises a dynamic host configuration protocol (DHCP) server configured to distribute a common Internet Protocol (IP) address across the first network; and
wherein all the first client WFD devices are IP addressable and can be connected in a debug mode to a mobile device using a wireless proprietary application.

12. The first network of claim 1, wherein the first AP WFD device is configured, upon receiving audio packets, to copy the audio packets to a playback buffer and to thereafter multi-cast the audio packets to the one or more first client WFD devices which are connected to it; and
wherein the first client WFD devices are only configured to receive and buffer the audio packets for playback.

13. The first network of claim 12, wherein the first client WFD devices and the first AP WFD device are configured to remain silent when there is one or more missing data packets and are configured to play data packets upon receiving actual audio data.

14. The first network of claim 1, comprising an aggregate audio stream comprising one or more of a first audio stream, a second audio stream, a third audio stream, and a fourth audio stream;
wherein an audio packet follows a same path and reaches all WFD devices in the first network.

15. The first network of claim 1, wherein the master AP WFD device comprises a capability to select an individual WFD device, a group of WFD devices, or all WFD devices in the first network to play an audio stream.

16. The first network of claim 1, comprising a local parent AP WFD device that is configured to maintain a connection to a particular first client WFD device by using a normal keep alive mechanism;
wherein a duration of the keep alive mechanism is reduced to approximately 10 seconds; and
wherein the first AP WFD device is connected to the other AP WFD devices through a bridge transmit aggregated health information to the master AP WFD device.

17. The first network of claim 1, wherein the one or more WFD devices comprise audio speakers in a public announcement system.

* * * * *